United States Patent [19]

Bösch

[11] Patent Number: 5,743,296
[45] Date of Patent: Apr. 28, 1998

[54] VALVE MECHANISM WITH CONSTRAINT GUIDE MEANS

[76] Inventor: Hubert Bösch, Sand-strasse 29, A-6890 Lustenau, Austria

[21] Appl. No.: 350,780

[22] Filed: Dec. 7, 1994

[30] Foreign Application Priority Data

Dec. 8, 1993 [DE] Germany ............ 43 41 816.3

[51] Int. Cl.⁶ ........................................ F16K 3/00
[52] U.S. Cl. .............. 137/614.21; 137/614.11; 251/279
[58] Field of Search ............ 137/614.11, 614.21; 251/279, 282

[56] References Cited

U.S. PATENT DOCUMENTS

| | | | |
|---|---|---|---|
| 1,156,049 | 10/1915 | Bopp | 137/614.11 |
| 3,397,862 | 8/1968 | Batzer et al. | |
| 4,495,966 | 1/1985 | Longamore | |
| 4,501,294 | 2/1985 | Bormioli | 137/614.11 |
| 5,247,964 | 9/1993 | DeLange | 137/614.21 |
| 5,332,002 | 7/1994 | Reimert | 137/614.21 |

FOREIGN PATENT DOCUMENTS

| | | | |
|---|---|---|---|
| 0277323B1 | 12/1987 | European Pat. Off. | |
| 1957309 | 11/1969 | Germany | |
| 3028786C2 | 7/1980 | Germany | |
| 3224387A1 | 6/1982 | Germany | |
| 3440070A1 | 11/1984 | Germany | |
| 12715 | of 1894 | United Kingdom | 137/614.11 |

OTHER PUBLICATIONS

Japan 4–119278 A. In: Patents ABstracts of Japan, M–1293, Aug. 11, 1992, vol. 16, No. 374.

Primary Examiner—A. Michael Chambers
Attorney, Agent, or Firm—Peter Riebling

[57] ABSTRACT

The present invention teaches a valve mechanism with constraint guide means. Both opening and closing of any valve working according to the principle of the invention is achieved by moving a central plate with respect to one or two plates for blocking flow through the valve. The constraint guide means according to preferred embodiments of the invention consist of grooves in the plates which cooperate with middle plate. As the grooves are inclined with respect to the direction of movement of the middle plate, a movement between these plates and the middle plate will cause opening or closing of the valve.

10 Claims, 6 Drawing Sheets

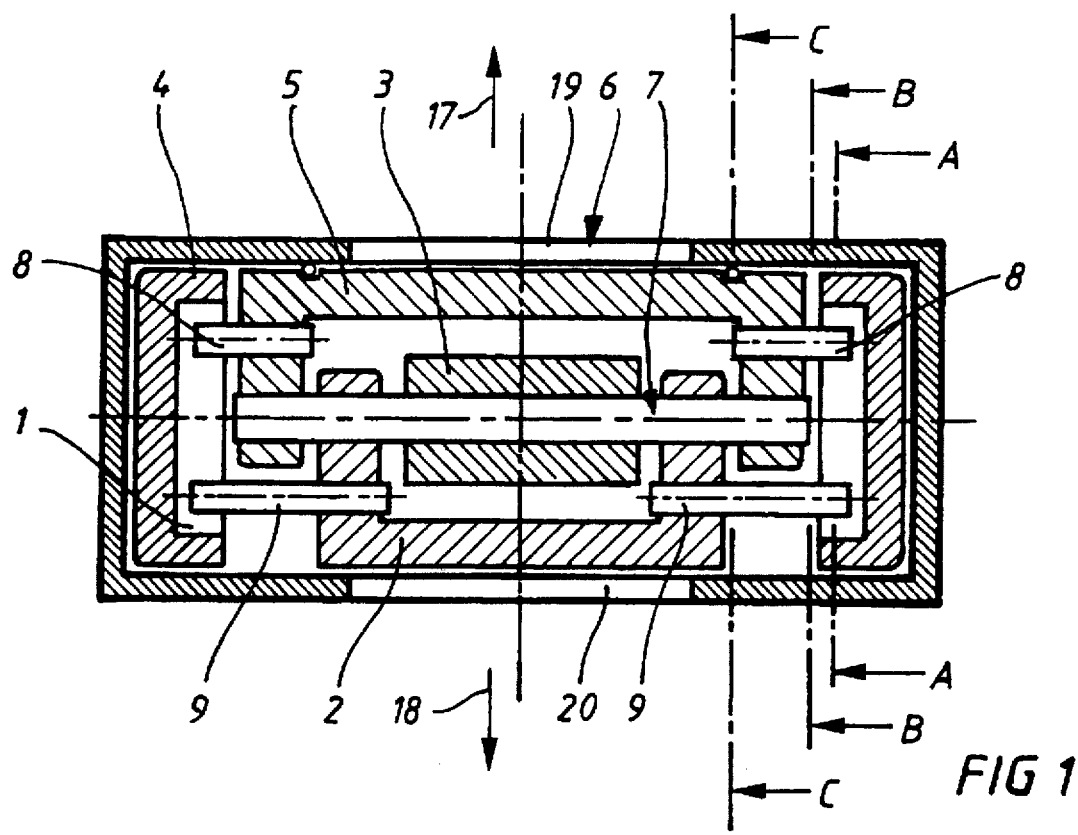
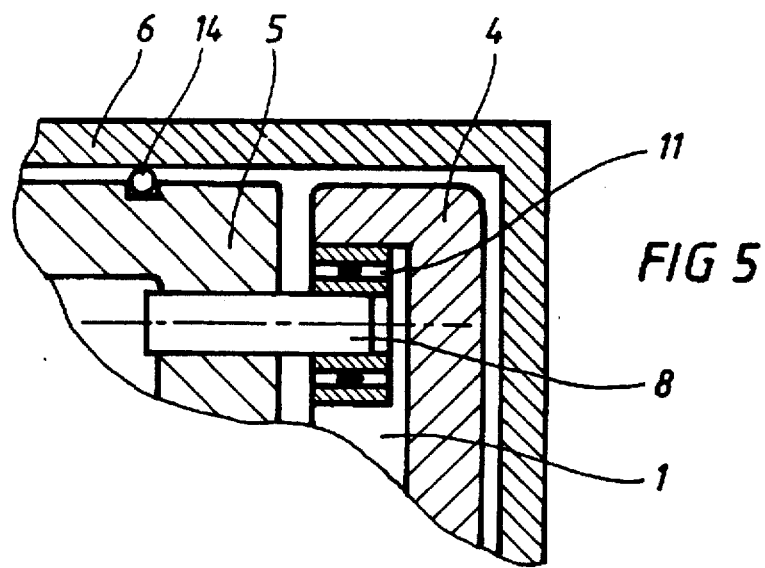

VALVE MECHANISM WITH CONSTRAINT GUIDE MEANS

DESCRIPTION OF THE PRIOR ART

The invention relates to valve mechanisms comprising one or more plates for opening and closing of the valve.

Similar valves or valve mechanisms have been known. German Patents DE 30 28 786 and DE 32 24 387 and U.S. Pat. No. 4,495,966 disclose valves wherein closing of the valve is effected by pivot links or balls. However, all these valves known to someone skilled in the art have the extreme disadvantage that opening of the valve, i.e. the necessary drawback of the plates from the valve openings, is effected by springs, which may have different forms. If the pressure difference between the sides of the valves rises considerably, it is necessary either to provide huge closing forces (high pressure) or huge opening forces (underpressure).

Other similar valves have been disclosed in the European Publication EP 0,277,323, U.S. Pat. No. 3,397,862 and JP 4-119278 A (Patent Abstracts of Japan) which are all working with opening springs and for that reason have the same disadvantages as the above mentioned publications.

A further German document, DE-OS 19 57 309 discloses a valve which is opened and closed partially with constraint guide means. In this document, opening and closing of the valve is obtained by an actuator means moving perpendicular to the movements of the plate. However, this constraint guide means have rather large contact surfaces which will lead to rapid destruction of the guide means and the valve itself. Moreover, the plate itself is not rigid but flexible so that opening of the valve occurs at least partially by opening springs.

It is practically impossible to open a vlve with valve openings with a diameter of 100 mm which is on one side exposed to a pressure near vacuum pressure, i.e. nearly 0 bar, and on the other side exposed to normal atmospheric pressure, i.e. 1 bar, by means of opening springs. The force required rises to about 800N.

The opening forces of a valve of known construction offer substantial disadvantages:

1. The huge opening springs require a lot of space.
2. The closing forces must overcome not only the pressure difference but also the force of the opening springs.
3. The opening springs tend to break under severe circumstances or due to rapid operation of the valve.

SUMMARY OF THE INVENTION

It is an object of the invention to provide a valve mechanism providing reliable opening and closing even under severe circumstances.

A further object of the invention is to provide a valve mechanism overcoming the disadvantages of known valve mechanisms.

These and other objects are accomplished by providing a valve comprising one or more moveable plates for opening and closing of the valve which is characterized in that opening and closing of the valve is effected by link means or constraint guide means.

The advantages of the invention are:
1. Reduction of the closing forces
2. Resistant and reliable construction
3. Rapid adaption to different conditions by changing the constraint guide means
4. Self-locking action of the valve in different positions may be provided The closing forces are reduced due to the constraint guide means as the force of the opening springs needn't be overcome for closing the valve. The closing forces only have to overcome the external pressure difference and the friction of the constraint guide means. As no opening springs are used, the construction is highly reliable even under severe working conditions.

The constraint guide means according to the invention consists of grooves in the plates and shafts extending into these grooves. The shafts are attached to a central plate which is moveable arranged inside the housing and moves perpendicular to the moving direction of the plates. As the grooves in the plates are inclined in a certain angle with respect to the moving direction of the plate, the plates may be lifted from or drawn to the central plate. By changing the geometric form of the grooves, providing another inclination angle or another geometric form it is possible to obtain different opening and closing characteristics for the valve itself.

In a first embodiment two plates are provided on seperate sides of a central plate. The valve can then be used for closing purposes in both flow direction. In this embodiment, the central plate needn't be guided in the housing as the two plates offer sufficient guiding.

In a second embodiment of the invention, only one plate is provided. The central plate in this embodiment is guided with respect to the housing.

The constraint guide means will work in both embodiments according to the same principle which is described briefly now, while a more detailed description will given with reference to the attached drawings below.

The central plate is provided with at least one shaft extending into the groves of the plate. The grooves have a certain inclination angle with regards to the moving direction of the central plate. The plates and the central plate may be drawn backwards to offer free flow through the valve. For closing the valve, the central plate is moved towards the valve openings. The plates will be transported by the shafts extending into the grooves or other suitable means in the same direction until their movement is blocked by suitable carriage stops. Due to further movement of the central plate, the shafts extending into the grooves of the plates will move with respect to them and press them against their respective seats. To provide higher efficiency, vertical guide means for the plates may provided.

For opening of the valve the central plate is drawn backwards, while the plates are still held in their position inside the openings by means of suitable carriage stops which may be the same as for closing. Due to this movement between the central plate and the plates, the shafts of the central plate will move in the grooves and draw the plates towards the central plate. As soon as the distance between the central plate and the plates as passed a predetermined minimum distance depending on the constraint guide means used, the carriage stops become ineffective and will allow movement of the plates in direction of the movement of the central plate.

It will be apparent to a person skilled in the art that these closing and opening procedure will work with two or only a single plate.

To minimize the friction at the contact points between the shafts and the grooves and the plates, the associated guide means and the housing, it is possible to provide the shafts with suitable bearings. Alternatively or additionally, a glide finish may be provided. To ensure safe movement of the plates together with the central plate it is possible to provide the central plate with means to catch the plates.

It will be appreciated from the foregoing that the invention represents a significant advance in valve operating mechanisms. Other aspects and advantages will become apparent from the following more detailed description.

BRIEF DESCRIPTION OF THE DRAWINGS

FIG. 1 is a sectional view of a valve mechanism in accordance with the present invention in a first embodiment while the valve is closed;

FIG. 5 is an enlarged detail of the valve mechanism of FIG. 1;

DESCRIPTION OF THE PREFERRED EMBODIMENTS

Figure 2:
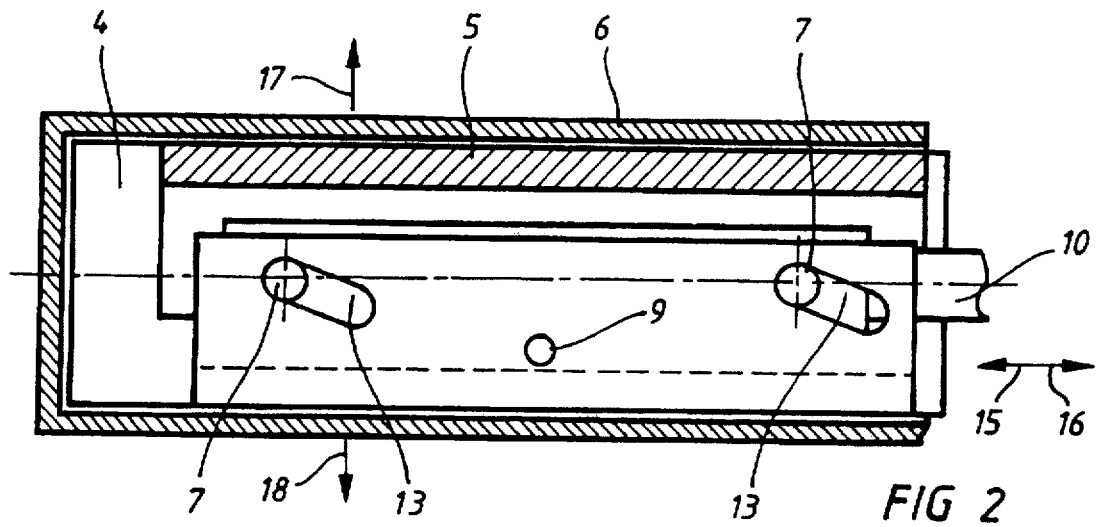
FIG. 2 is a sectional view of the valve mechanism of FIG. 1, taken along the line C—C.

In the drawings the same reference numerals are used to designate identical parts of the valve mechanism according to the present invention. As shown more in detail, FIG. 1 shows a sectional view of a first embodiment of a valve mechanism in accordance with the present invention.

The mechanism is included in a housing 6 provided with a charge opening 19 and a discharge opening 20. Included in the housing 6 are guide means 4 with respective grooves 1, a central plate 3 and plates 2, 5. By suitable arrangement of the plates 2, 3, 5 a flow in both directions may be obtained.

The plates 2, 5 are provided with shafts 8, 9 to be guided in the grooves 1 of the guide moans 4. It is possible to provide only a single groove 1 on each side of the plates 2, 5 as shown in FIG. 1 or to use several grooves. The central plate 3 is provided with two shafts 7 extending in grooves elongated slots or elongated openings 12, 13 in the plates 2, 5. It will be understood that either more or less shafts 7 may be used. To ensue tight closure of the valve the plates 2, 5 may be provided each with an O-Ring 14.

Figure 3:
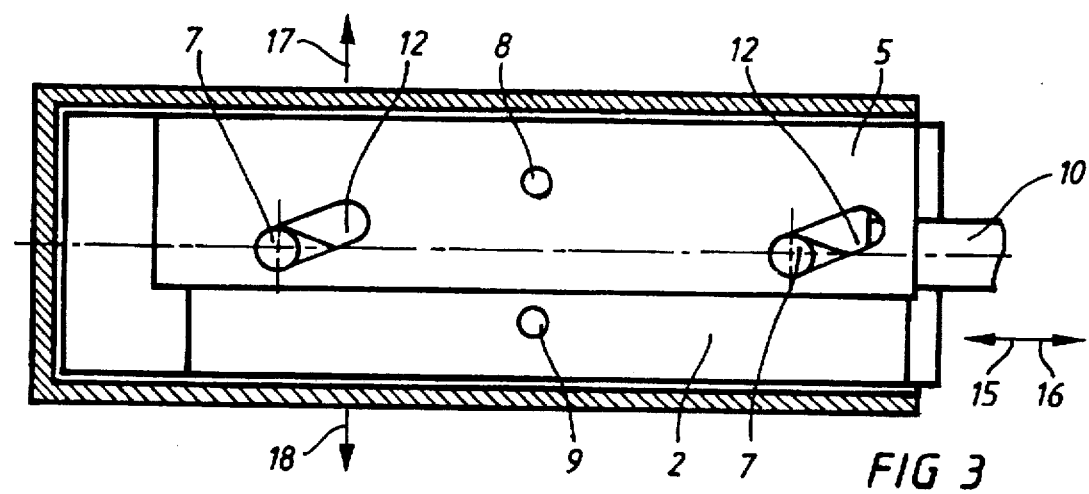
FIG. 3 is a sectional view of the valve mechanism of FIG. 1, taken along the line B—B.
Figure 4:
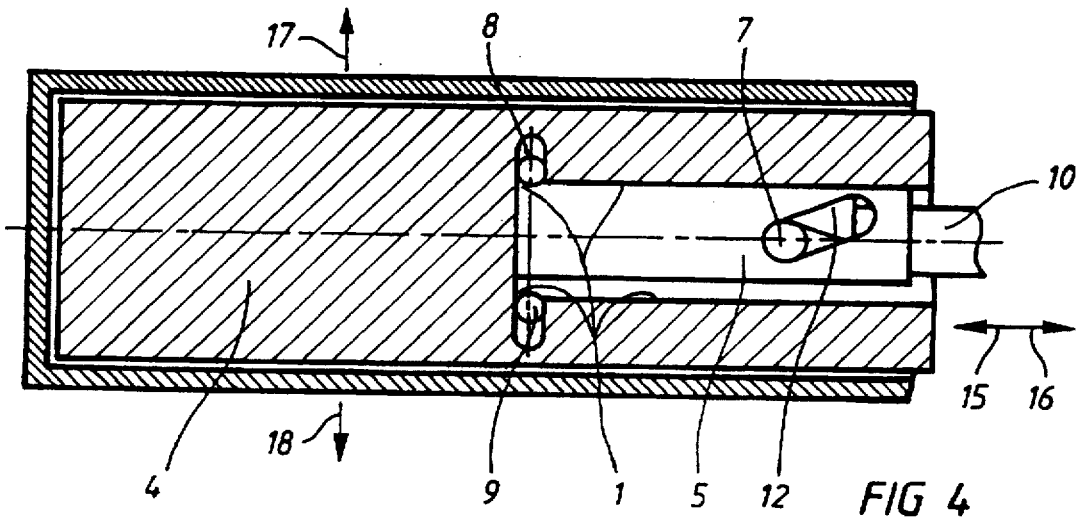
FIG. 4 is a sectional view of the valve mechanism of FIG. 1, taken along the line A—A.
Figure 6:
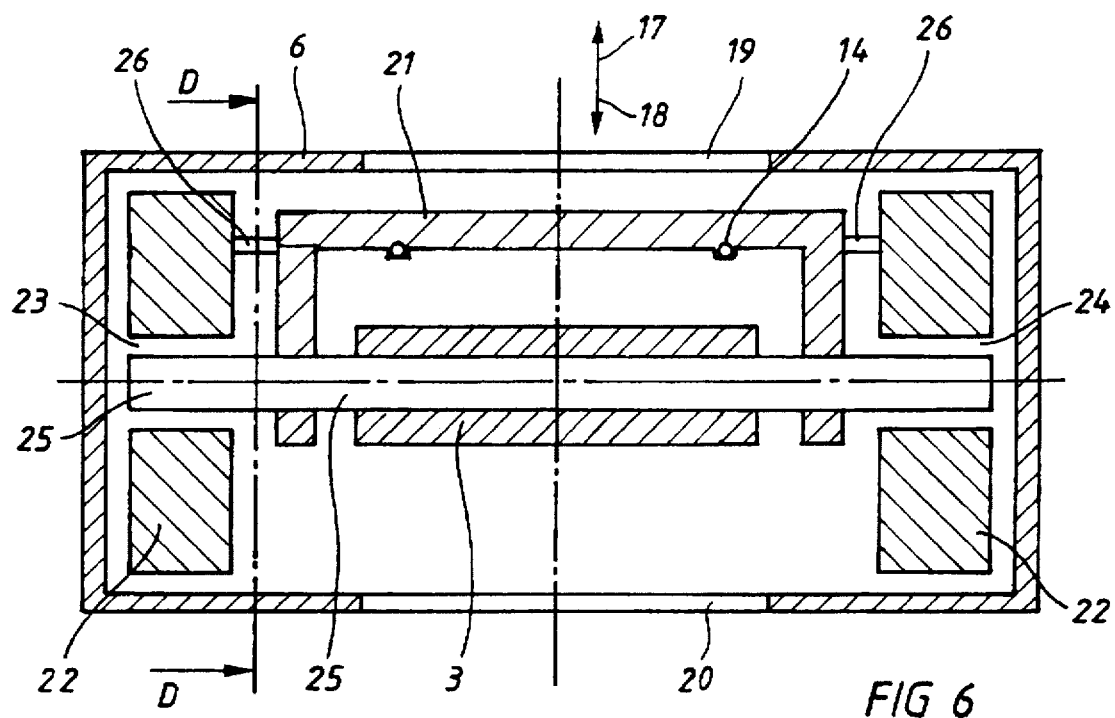
FIG. 6 is a sectional view of a valve mechanism in accordance with the present invention in a second embodiment.
Figure 7:
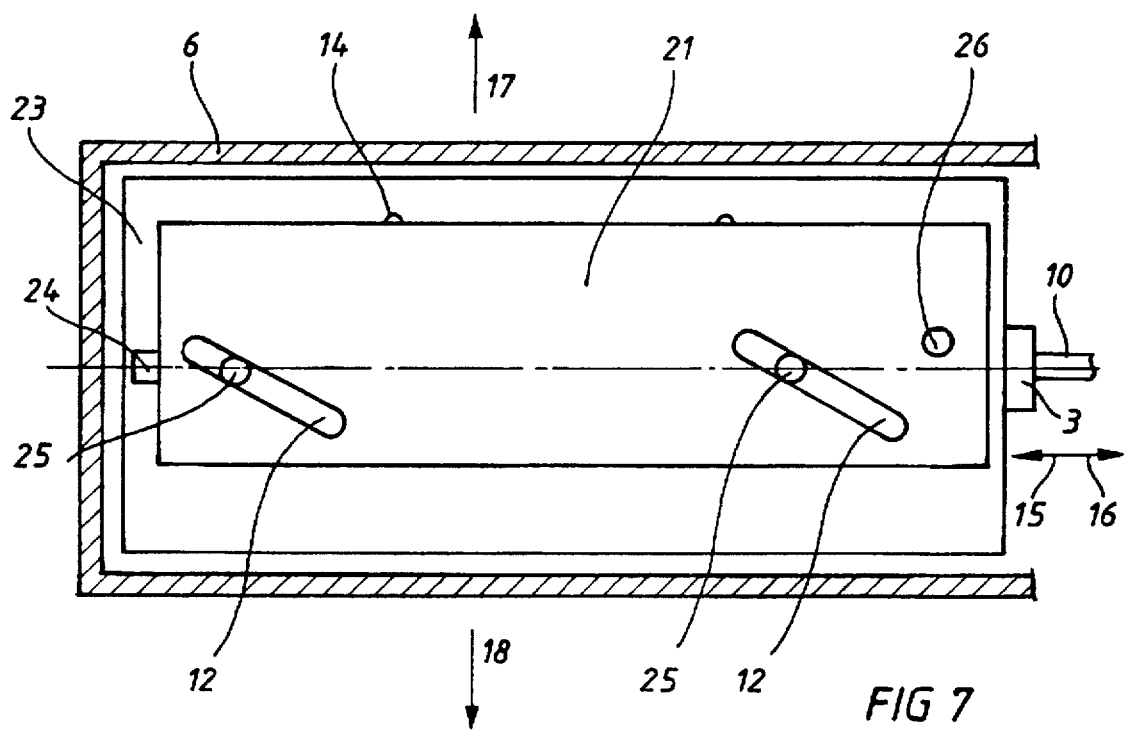
FIG. 7 is a sectional view of the valve mechanism of FIG. 6, taken along the line D—D.

FIG. 2–4 show several sectional views of the valve in the embodiment shown in FIG. 1. The central plate 3 is provided with an actuator rod 10 used to open and close the valve. The actuation means of the actuator rod 10 are not shown.

The constraint guide means clearly visible in FIG. 2–4 are provided in form of grooves 12, 13 in the plates 2, 5, respectively and the shafts 7 attached to the central plate 3. The plates 2, 5 are provided from movement in directions 15, 16 by shafts 8, 9, as long as tho distance between them and the central exceeds a certain value. For that reason, the plates 2, 5 may under this circumstances only be moved in directions 17, 18 for opening or closing the valve.

For opening the valve, the action rod 10 is drawn in direction 16. The central plate 3 attached to the actuation rod 10 follows this movement causing the shafts 7 to move in direction 16 as well. The plates 2, 5 are still held in position by the shaft 8, 9 extending in the grooves 1 of the guide means 4 and can't move in directions 15, 16 but only upwards or downward in directions 17, 18. The change of direction from direction 15, 16 of the central plate 3 to direction 17, 18 of the plates 2, 5 is obtained by the shafts 7 extending in the grooves 12, 13 and causing the plates 2, 5 to move upwards or downwards. As soon as the plates 2, 5 have reached a minimal distance from the central plate 3, the shafts 8, 9 leave the vertical part of the grooves 1 and may be moved in the same direction as the central plate 3 (FIG. 4).

The plates 2, 5 will then be drawn further in direction 16 together with the central plate 3 in order to obtain free flow through the valve.

In this embodiment it is not necessary to guide the central plate 3 for opening or closing the valve. The central plate 3 is guided by the shafts 7 extending in the grooves 12, 13 of the plates 2, 5. As the grooves 12, 13 show substantially the same form the central plate 3 will be bold in the middle. It is clear for someone skilled in the art that guide means for the central plate 3 extend in the guide means 4 may be provided if necessary, for example by having the shafts 7 extend in the grooves 1.

For closing the valve the central plate 3 is moved in direction 15, taking with it the plates 2, 5. As soon as the shaft 8, 9 come in contact with the vertical end of the grooves 1 the plates 2, 5 can't be moved further in direction 15. Upon continuous movement of the central plate 3 in direction 15, the shafts 7 glide in the grooves 12, 13 of the plates 2, 5 which are accordingly separated in directions 17, 18, respectively, block the openings 19, 20 and thus close the valve. To ensure free movement of the plates 2, 3, 5 the diameter of the shafts 8, 9 extending in the grooves 1 may be slightly smaller than the height of the grooves to allow small movements of the plates 2, 3, 5. The central plate 3 may be provided with further means to transport the plates 2, 5 with it in directions 15, 16.

The shafts 7, 8, 9 are attached rigidly and non rotationally to the respective plates 2, 3, 5. Each way of attachment, welding, press fit or any other is claimed for the present invention.

As shown in FIG. 5, the shafts may the provided with suitable bearings 11 in order to minimize the friction between the shafts 7, 8, 9 and the respective grooves 1, 12, 13. It is of course possible to add a glide finish to the shafts, the grooves or both of them. This finish may be applied additionally or alternatively.

FIG. 6–10 display a second embodiment of the valve mechanism according to the invention. In this embodiment only one plate 21 is used. It will be clear to someone skilled in the art that the opening and closing process and the general construction are similar to the embodiment described above.

The main difference between the first embodiment already discussed and the second embodiment shown in FIG. 6–9 is that the central plate 3 is provided with elongated shafts 25 extending through the grooves 12 in the plate 25 in the grooves 23, 24 of respective guide means 22 arranged in the housing 6. This guiding of the central plate 3 is necessary due to the force applied by the single plate 21 on the central plate 3. The plate 21 is provided with one or more shafts 26, serving both for additional guiding and as carriage stop for opening and closing the valve.

The grooves 23, 24 are provided with a mounting part 29 at their end acting together with the shaft 26 as carriage stop.

Figure 8:
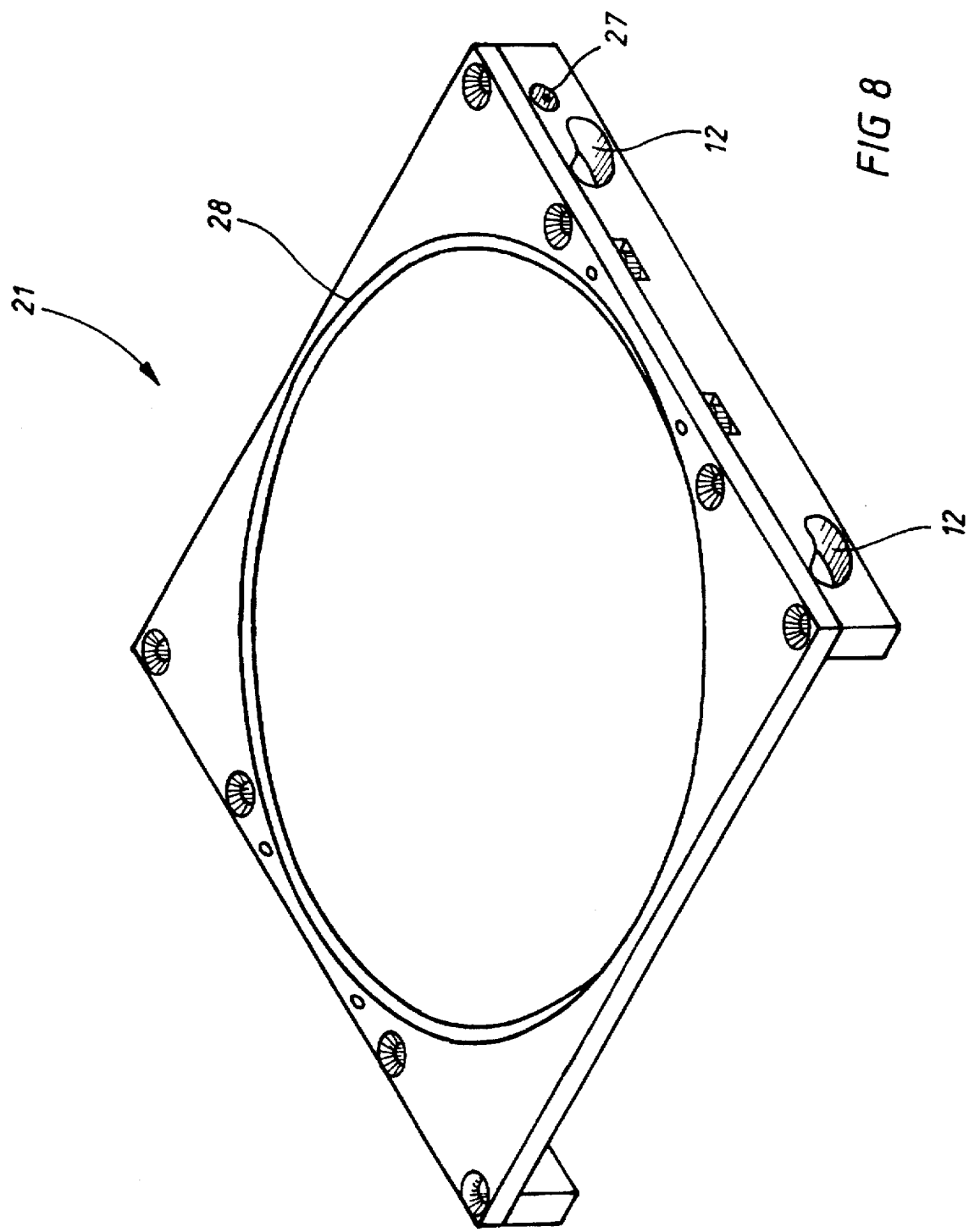
FIG. 8 is perspective view of a plate.

FIG. 8 is a perspective view of the plate 21 which however may be used with small modifications only in the first embodiment as well. In this figure, the grooves 12 are of general arc-like form. The plate 25 in provide with an annular groove 28 on its upper side to receive an O-ring, as well as the plates 2, 5. On each side of the plate 21 there is provided a drilling 27 to receive the shaft 26.

Figure 9:
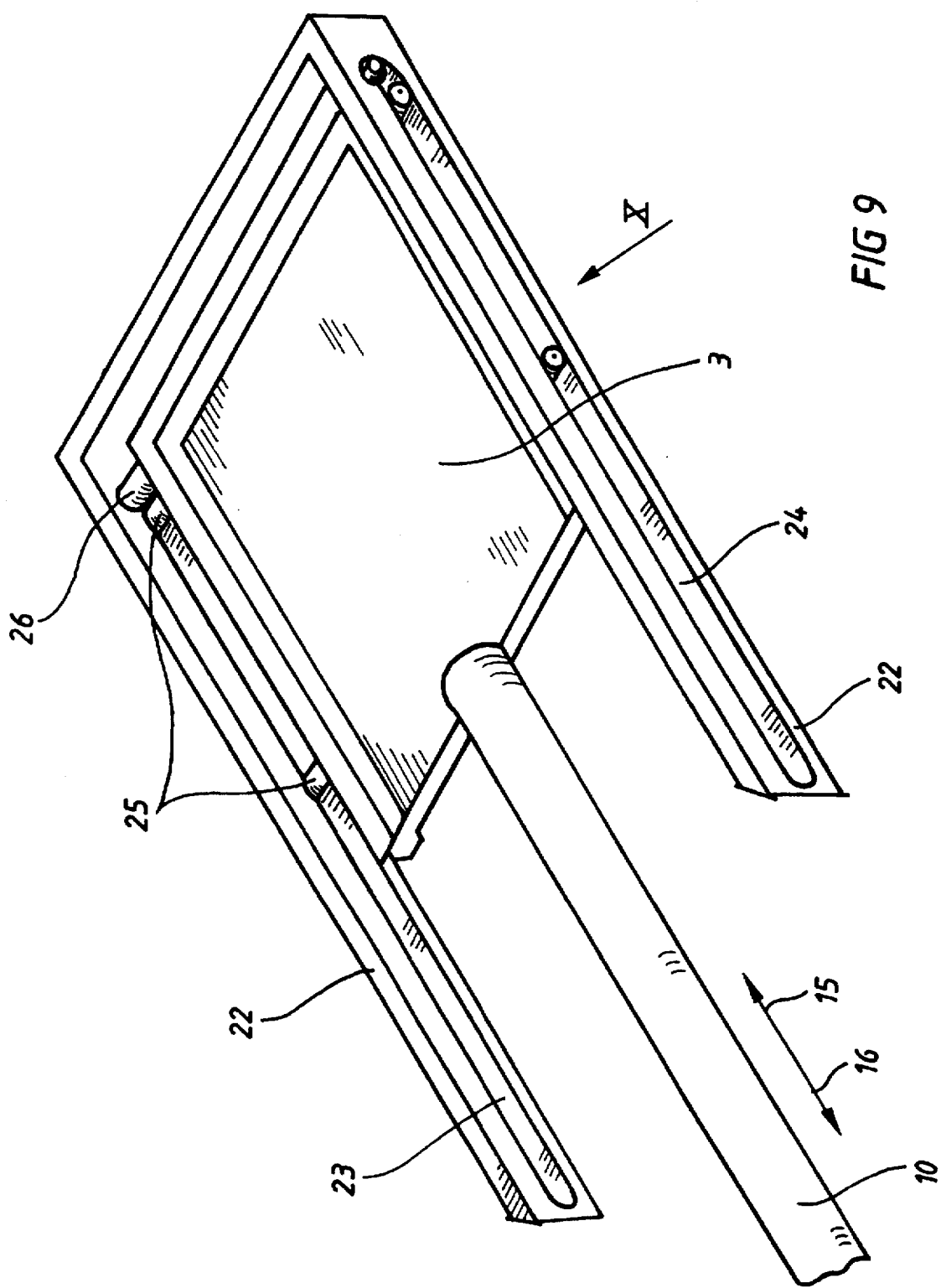
FIG. 9 is a perspective view of the central plate with guide means according to a second embodiment as displayed in FIG. 6.

FIG. 9 shows a perspective view of the central plate 3 together with the guide means 22. It can be seen that the shafts 25 extend in the grooves 23, 24 of the guide means 22, holding the central plate 3 in its vertical position.

According the first embodiment, is possible to provide bearings 11 an/or a glide finish to reduce friction.

Figure 10:
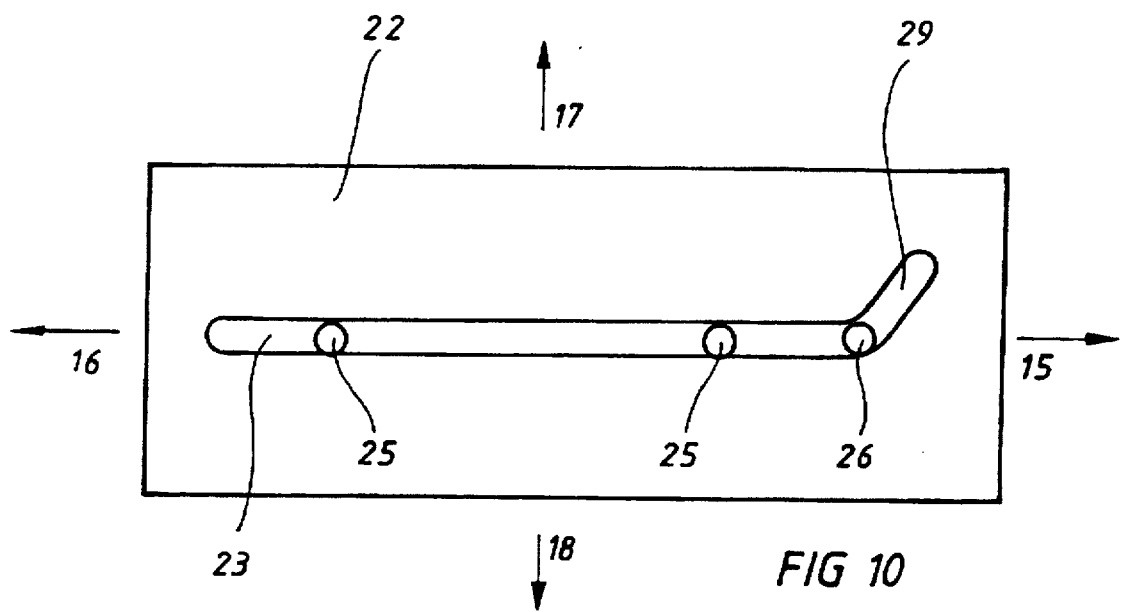
FIG. 10 is a view in direction X in FIG. 9.

FIG. 10 displays a schematic view on the grooves 23, 24 respectively. Only one grave is provided for the shafts 25 of the central plate 3 and for the shafts 26 of the plate. The part or angular part of the grove 23, 29 of the grooves 23, 24 is therefor necessary to allow movement of the plate 21 in directions 17, 18 for opening and closing the valve.

Figure 11:
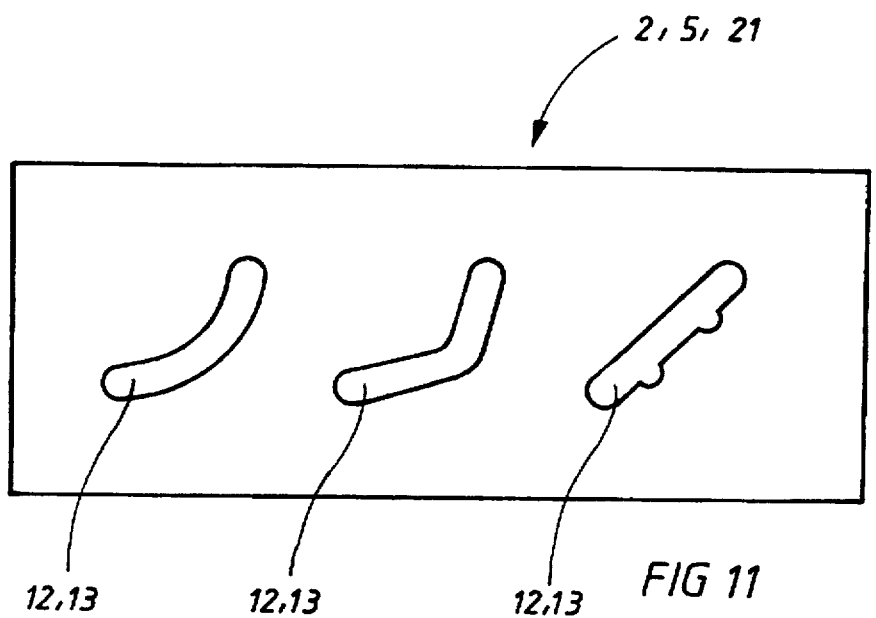
FIG. 11 is a side elevational view on a plate used in the valve mechanism according to the present invention.

FIG. 11 is a schematic side elevantional view on a plate 2, 5, 21, respectively. The grooves 12, 13 may be of more or less longitudinal form as displayed in FIG. 2–7, of arc-like shape as in FIG. 9, 11 or of any other suitable shape. It is possible to combine two longitudianl shapes as shown in the middel example of FIG. 11. The same can be done with arc-like shapes.

It is further possible to provide the grooves 12, 13 with recesses as in the right example according to FIG. 11. This will lead to several resting points for the valve which may either be used for safety purposes, as a complete opening of the valve cannot occur or to limit the flow through the valve.

In a special embodiment the shafts 7, 25 and the grooves 12, 13 are adapted to each other in order to achieve self-blocking of the valve. This means that the plates 2, 5, 21 cannot be moved towards the central plate 3 because the shafts 7, 25 are stuck in the grooves 12, 13. It is however possible to unblock them by moving the central plate 3 in the opening direction 16. With this embodiment it is practically impossible that a self-opening of the valve will occur.

Valve mechanisms in accordance with the invention offer high advantages over the valve mechanisms so far known as they provide high reliability and simple construction at the same time. It will be understood that various changes rearrangements and/or omissions in the details, the materials or the arrangement of the parts described herein may be maded by those stilled in the art within the principle and scope of the invention as expressed in the amended claims.

I claim:

1. A valve mechanism for opening and closing of the valve, the valve comprises a housing with an inlet and an outlet opening. the mechanism comprising:

guide means oppositely disposed in said housing;

at least one movable plate arranged in-between said guide means;

a central plate movably arranged in-between said guide means and in parallel to the movable plate;

the movable plate is provided with slots and with shafts which are fixedly connected thereto;

the shafts are guided in the guide means; and the central plate having at least one shaft fixedly connected thereto, the shaft extends through said slots in the movable plate and is guided in said guide means.

2. Valve mechanism according to claim 1, wherein respective grooves in the plates are inclined at a certain angle with regards to the direction of movement of the central plate.

3. Valve mechanism according to claim 2, wherein the grooves are of substantially longitudinal form.

4. Valve mechanism according to claim 2, wherein the grooves comprise one or more arc-shaped parts.

5. Valve mechanism according to claim 2, wherein the grooves offer self-blocking action together wit h the shafts.

6. Valve mechanism according to claim 2, wherein the grooves are provided with one or more recesses to receive the shafts for blocking of the plates in predetermined positions.

7. Valve mechanism according to claim 2, wherein the plates are provided with one or more stop means for blocking movement of the respective plate in the direction of movement of the central plate at the beginning of opening and closing the valve.

8. Valve mechanism according to claim 1, wherein each plate is guided by shafts in respective grooves in a housing.

9. Valve mechanism according to claim 1, wherein the shafts are provided with bearings the grooves are provided with a glide finish.

10. Valve mechanism according to claim 1, wherein the central plate is guided with respect to a housing.

* * * * *